United States Patent
Shaffer et al.

(10) Patent No.: US 8,765,824 B2
(45) Date of Patent: Jul. 1, 2014

(54) ETHANOL STABLE POLYETHER EPOXY BASED MEMBRANE FOR ETHANOL AND AROMATICS SEPARATION

(75) Inventors: Timothy D. Shaffer, Hackettstown, NJ (US); Man Kit Ng, Annandale, NJ (US); David T. Ferrughelli, Flemington, NJ (US); George Skic, Lambertville, NJ (US); Randall D. Partridge, Califon, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/446,488

(22) Filed: Apr. 13, 2012

(65) Prior Publication Data
US 2012/0270958 A1 Oct. 25, 2012

Related U.S. Application Data

(60) Provisional application No. 61/476,988, filed on Apr. 19, 2011.

(51) Int. Cl.
*B01D 71/46* (2006.01)

(52) U.S. Cl.
USPC ............................................. 521/27; 568/913

(58) Field of Classification Search
USPC .............. 210/640, 651, 652; 521/27; 588/913
See application file for complete search history.

(56) References Cited

U.S. PATENT DOCUMENTS

| | | | |
|---|---|---|---|
| 4,914,064 A | 4/1990 | Schucker | |
| 4,929,358 A | 5/1990 | Koenitzer | |
| 4,944,880 A | 7/1990 | Ho et al. | |
| 4,946,594 A | 8/1990 | Thaler et al. | |
| 4,990,275 A | 2/1991 | Ho et al. | |
| 4,997,906 A | 3/1991 | Thaler et al. | |
| 5,550,199 A | 8/1996 | Ho et al. | |
| 5,670,052 A | 9/1997 | Ho et al. | |
| 5,753,008 A * | 5/1998 | Friesen et al. | 95/45 |
| 2003/0233934 A1* | 12/2003 | Wijmans et al. | 95/46 |
| 2008/0035575 A1* | 2/2008 | Partridge et al. | 210/651 |
| 2010/0059441 A1* | 3/2010 | Pattil et al. | 210/651 |
| 2013/0133249 A1* | 5/2013 | Drury et al. | 44/639 |

FOREIGN PATENT DOCUMENTS

| | | |
|---|---|---|
| EP | 0 489 417 A2 | 12/1991 |
| WO | 2010/030357 A2 | 3/2010 |
| WO | WO-2010/030357 A2 * | 3/2010 |

OTHER PUBLICATIONS

Tanihara, Nozomu, Umeo, Nobuhiro, Kawabata, Takashi, Tanaka, Kazuhiro, Kita, Hidetoshi, Okamoto, Ken-ichi, "Pervaporation of organic liquid mixtures through poly (ether imide) segmented copolymer membranes", Journal of Membrane Science 104 (1995) pp. 181-192.

* cited by examiner

*Primary Examiner* — Peter D. Mulcahy
*Assistant Examiner* — Henry Hu
(74) *Attorney, Agent, or Firm* — David M. Weisberg; Paul E. Purwin

(57) ABSTRACT

The present invention is directed to a membrane for ethanol and aromatics separation that is stable in an alcohol containing environment. The membrane is a polyether epoxy resin having an aliphatic substituted epoxide. The invention also teaches a method to control the flux and selectivity of the membrane.

5 Claims, 5 Drawing Sheets

ETHANOL STABLE POLYETHER EPOXY BASED MEMBRANE FOR ETHANOL AND AROMATICS SEPARATION

CROSS-REFERENCE TO RELATED APPLICATIONS

This application claims priority to U.S. Provisional Application Ser. No. 61/476,988 filed Apr. 19, 2011, herein incorporated by reference in its entirety.

FIELD OF THE INVENTION

This invention relates to a polymeric membrane composition that exhibits stability in the presence of an alcohol, a method of making the polymeric membrane, and a process for controlling the separation of components of a hydrocarbon feedstream including hydrocarbon streams containing at least one alcohol utilizing the polymeric membrane. More particularly, but not by way of limitation, this invention relates to the polymeric membrane composition and its use in a process for the separation of ethanol and aromatics from a hydrocarbon feedstream containing aromatics and aliphatic compounds and at least one alcohol, typically ethanol.

BACKGROUND OF THE INVENTION

Polymeric membrane based separation processes such as reverse osmosis, pervaporation and perstraction are known in the art. In the pervaporation process, a desired feed component, e.g., an aromatic component, of a liquid and/or vapor feed is preferentially absorbed by the membrane. The membrane is typically exposed at one side to a stream comprised of a mixture of liquid feeds, and a vacuum is typically applied to the membrane at the opposite side so that the adsorbed component migrates through the membrane and is removed as a vapor from the opposite side of the membrane via a solution-diffusion mechanism. A concentration gradient driving force is established to selectively pass the desired components through the membrane from its feed or upstream side to its permeate or downstream side.

The perstraction process may also be used to separate a liquid stream into separate products. In this process, the driving mechanism for the separation of the stream into separate products is provided by a concentration gradient exerted across the membrane. Certain components of the fluid will preferentially migrate across the membrane because of the physical and compositional properties of both the membrane and the process fluid, and will be collected on the other side of the membrane as a permeate. Other components of the process fluid will not preferentially migrate across the membrane and will be swept away from the membrane area as a retentate stream. Due to the pressure mechanism of the perstraction separation, it is not necessary that the permeate be extracted in the vapor phase. Therefore, no vacuum is required on the downstream (permeate) side of the membrane and permeate emerges from the downstream side of the membrane in the liquid phase. Typically, permeate is carried away from the membrane via a swept liquid.

The economic basis for performing such separations is that the two products achieved through this separation process (i.e., retentate and permeate) have a refined value greater than the value of the unseparated feedstream. Membrane technology based separations can provide a cost effective processing alternative for performing the product separation of such feedstreams. Conventional separation processes such as distillation and solvent extraction can be costly to install and operate, in comparison with membrane process alternatives. These conventional based processes can require a significant amount of engineering, hardware and construction costs to install and also may require high operational and maintenance costs. Additionally, most of these processes require substantial heating of the process streams to relatively high temperatures in order to separate different components during the processing steps resulting in higher energy costs than are generally required by low-energy membrane separation processes.

A major obstacle to commercial viability of membrane separation technologies, particularly for hydrocarbon feeds, is to improve the flux and selectivity while maintaining or improving the physical integrity of current membrane systems. Additionally, the membrane compositions need to withstand the myriad of applications feed constituents, including alcohols.

Numerous polymeric membrane compositions have been developed over the years. Such compositions include polyurea/urethane membranes (U.S. Pat. No. 4,914,064); polyurethane imide membranes (U.S. Pat. No. 4,929,358); polyester imide copolymer membranes (U.S. Pat. No. 4,946,594); polyimide aliphatic polyester copolymer membranes (U.S. Pat. No. 4,990,275); and diepoxyoctane crosslinked/esterified polyimide/polyadipate copolymer (diepoxyoctane PEI) membranes (U.S. Pat. No. 5,550,199).

Another obstacle is the presence of alcohol in the feedstream, an increasingly frequent issue with government mandates and other incentives for adding alcohols to conventional hydrocarbon based fuels. Conventional polymer membranes suffer from instability in the presence of even small amounts of alcohol in the membrane feedstream. The present invention solves this problem.

Therefore there is a need in the industry for new membrane compositions with improved stability in processing alcohol containing feeds. There is also a need in the industry for new membrane compositions having high flux and selectivity for separating aromatics.

SUMMARY OF THE INVENTION

The present invention relates to a polymeric aromatic selective membrane comprising a polyether epoxy resin, a method of making the polymeric membrane, and a controllable process for separating components of a feedstream utilizing the polymeric membrane. In particular, the polymeric membrane of the present invention may be utilized in a process for selectively separating ethanol and aromatics from a hydrocarbon feedstream comprised of aromatic and aliphatic hydrocarbons, including feedstreams that contain at least one alcohol, typically ethanol.

In one embodiment, the present invention relates to the composition of a polymeric membrane effective in selectively separating components of a hydrocarbon feedstream. In particular, the present invention relates to the composition of a polymeric membrane effective in the selective separation of aromatics from a hydrocarbon stream containing aromatics and non-aromatics, including feedstreams that contain at least one alcohol. This invention results in a membrane composition with improved membrane physical integrity when used in an alcohol containing environment.

In one embodiment, the present invention relates to a membrane comprising a polyether epoxy resin having an aliphatic substituted epoxide where the epoxide does not contain a heteroatom within three (3) atoms of the epoxide group, fabricated into thin film membranes.

In a preferred embodiment, the membrane composition is stable for feeds containing ten percent (10%) or higher alcohol content.

DETAILED DESCRIPTION OF THE PREFERRED EMBODIMENTS

Figure 1:
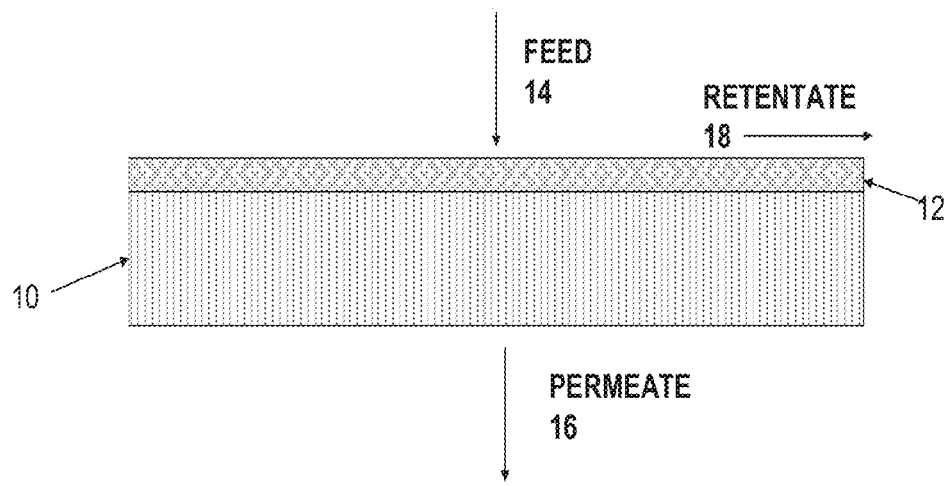
FIG. 1 illustrates a simple embodiment of the present invention.

As used herein, the term "hydrocarbon" means an organic compound having a predominantly hydrocarbon character. Accordingly, organic compounds containing one or more non-hydrocarbon radicals (e.g., sulfur or oxygen) would be within the scope of this definition. As used herein, the terms "aromatic hydrocarbon" or "aromatic" means a hydrocarbon-based organic compound containing at least one aromatic ring. The rings may be fused, bridged, or a combination of fused and bridged. In a preferred embodiment, the aromatic species separated from the hydrocarbon feed contains one or two aromatic rings. The terms "non-aromatic hydrocarbon" or "non-aromatic" or "saturate" means a hydrocarbon-based organic compound having no aromatic cores. The terms "non-aromatics" and "aliphatics" are used interchangeably in this document.

Also as used herein, the term "selectivity" means the ratio of the desired component(s) in the permeate, to the non-desired component(s) in the permeate divided by the ratio of the desired component(s) in the feedstream to the non-desired component(s) in the feedstream. The term "aromatic selectivity" means (Ap/Af)/(nC7p/nc7f). The term "ethanol+aromatic selectivity" means ((Ep+Ap)/(Ef+Af))/(nC7p/nC7f) where all weight fractions with Ep=Ethanol in the permeate, Ap=aromatics in the permeate, and Ef=Ethanol in the feed, Af=aromatics in the feed, and similarly nC7 is representative of non-aromatic hydrocarbons in the feed and permeate.

The term "flux" or "normalized flux" is defined the mass rate of flow of the permeate across a membrane usually in dimensions of g/m2-sec, or g-μm/m$^2$-sec. Also used herein, the term "selective" means that the described part has a tendency to allow one or more specific components of the feedstream to preferentially pass through that part with respect to the other feedstream components. The selectivity of the membrane of the present invention is greater than about 1.5, preferably greater than about 2.0, and most preferably greater than about 3.0.

It was found that a representative number of commercially available epoxies such as diaromatic or triaromatic epoxies that have an oxygen atom between the epoxide ring and the aromatic moiety give rise to polymer membrane resins that consistently undergo degradation in ethanol containing hydrocarbon feeds while operating at the pervaporation temperature. The present invention substantially reduces the problem.

We have found that polyether epoxy resins having an aliphatic substituted epoxide wherein the epoxide does not contain a heteroatom within three atoms of the epoxide group substantially reduces membrane degradation in the presence of an alcohol, such as ethanol for example.

In another embodiment, the epoxides are fully aliphatic, aromatic or contain both aliphatic and aromatic character. Examples include 1,2,7,8-diepoxyoctane, cyclooctadiene diepoxide and divinylbenzene diepoxide. Using these epoxides and alternative embodiments of diamine containing polyether polymers and oligomers, produces ethanol stable pervaporation membranes. Examples of suitable diamine containing materials include the Jeffamine® (Huntsman) resins which are bis-isopropylamine terminated polypropylene oxide and polyethylene oxide oligomers.

Comparative Data Showing Material Stability

Several groups of membrane epoxide materials were developed and tested to indicate their stability to alcohol containing feeds. The following data is provided to illustrate one aspect of the invention. Acronyms and descriptions of the epoxies and amines used to prepare polymer samples for testing are provided in Table 1.

TABLE 1

Acronyms and Descriptions of the Epoxies and Amines Used

| Acronym Epoxy | Mol. Wt. | Description |
|---|---|---|
| Acronyms and Descriptions of the Epoxies and Amines Used | | |
| BADGE | 340.41 | Bisphenol A diglycidyl ether |
| TAMTGE | 460.52 | Tris(4-hydroxyphenyl)methane triglycidyl ether |
| TMPTGE | 302.36 | Trimethylolpropane triglycidyl ether |
| DENO | 142.2 | 1,2,7,8-Diepoxy-n-octane |
| MBDGA | 422.52 | 4,4'-Methylene(N,N-diglycidylaniline) |
| EGDGE | 174.2 | Ethylene glycol diglycidyl ether |
| PEGDGE526 | 526 | Poly(ethylene glycol) diglycidyl ether, average Mn 526 |
| PPGDGE640 | 640 | Poly(propylene glycol) diglycidyl ether, average Mn 640 |
| Amine or Jeffamine☐ (Huntsman or Aldrich) | | |
| EDR104 | 104 | 2,2'-Oxybis(ethylamine), MW 104 |
| EDR176 | 176 | 1,2-Bis(aminopropyl) ethylene glycol, MW 176 |
| D230 | 230 | Poly(propylene glycol) bis(2-aminopropyl ether), Mn ~230 |
| D400 | 400 | Poly(propylene glycol) bis(2-aminopropyl ether), Mn ~400 |
| D2000 | 2000 | Poly(propylene glycol) bis(2-aminopropyl ether), Mn ~2000 |
| D4000 | 4000 | Poly(propylene glycol) bis(2-aminopropyl ether), Mn ~4000 |
| ED600 | 600 | Poly(propylene glycol)-block-poly(ethylene glycol)-block-poly(propylene glycol) bis(2-aminopropyl ether), Mn ~600 |
| TAM440TA | 440 | Trimethylolpropane tris[poly(propylene glycol), amine terminated] ether |
| HMDA | 116.21 | Hexamethylenediamine |
| MOCA | 267.15 | 4,4'-Methylene-bis(2-chloroaniline) |

Candidate membrane polymers were prepared by mixing near stoichiometric (1.0 epoxy/amine H) amounts of the epoxy and amine reagents (3 to 5 g total), with a small amount of toluene (0.5 g) solvent in a closed vial. The mixture was heated from room temperature up to 60° C. until a noticeable increase in viscosity was obtained, and then poured into aluminum weighing pans to obtain a thin film. Curing was completed by allowing the solvent to evaporate and heating up to 120-150° C. for several hours in a vacuum oven. A sample plug (~0.2 g) was cut from the cured polymer film for the ethanol stability test. The weighed polymer sample (~0.2 g) was covered with 3 g of 200 proof ethanol and held for 3 days at 150° C. under autogenous pressure in a sealed stainless steel vessel. After cooling the wet sample was removed, weighed wet, then dried at 60° C. and weighed again to determine extent of swelling (weight of ethanol absorbed/original sample weight) and polymer weight loss.

The comparative data is shown in Table 2.

TABLE 2

3 Day Ethanol Stability Test Results
3 Day Ethanol Stability Test

| Epoxy | Amine | Polymer Retained % | Swelling Ethanol % on Polymer | Polymer Loss % | Equivalent Epoxy/NH | Test# |
|---|---|---|---|---|---|---|
| U.S. Pat. No. 5,550,199, Example 3 diepoxide crosslinked/ esterified polyimide-aliphatic polyester copolymers | | | | | | |
| DENO | PMDA-MOCA-PEA1000 | 3.0 | Mostly Dissolved | 97 | | Base |
| Diaromatic Glycidylethers | | | | | | |
| BADGE | D230 | 97.3 | 26.7 | 2.7 | 0.75 | 25 |
| BADGE | D400 | 97.2 | 37.6 | 2.8 | 0.75 | 26 |
| BADGE | D2000 | 90.4 | 133.6 | 9.6 | 0.75 | 27 |
| TriAromatic Glycidylethers | | | | | | |
| TAMTGE | D230 | 89.3 | 60.8 | 10.7 | 1.00 | 7 |
| TAMTGE | D400 | 98.4 | 21.8 | 1.6 | 1.00 | 92 |
| TAMTGE | D2000 | 69.5 | 186.5 | 30.5 | 1.00 | 8 |
| TAMTGE | D4000 | 71.3 | 166.0 | 28.7 | 1.00 | 15 |
| Aliphatic Glycidylethers | | | | | | |
| TMPTGE | D230 | 0.0 | Dissolved | 100.0 | 1.00 | 6 |
| EGDGE | ED600 | 80.3 | 204 | 19.7 | 1.05 | 46 |
| PEGDGE526 | EDR176 | 0.0 | Dissolved | 100 | 1.05 | 97 |
| Aromatic Diglycidylanilines | | | | | | |
| MBDGA | D400 | 90.2 | 17.2 | 9.8 | 1.05 | 134 |
| MBDGA | ED600 | 82.2 | 15.9 | 17.8 | 1.05 | 135 |
| Aliphatic Epoxides | | | | | | |
| DENO | D230 | 99.0 | 41.6 | 1.0 | 1.05 | 104 |
| DENO | D400 | 97.4 | 52.9 | 2.6 | 1.05 | 113 |
| DENO | ED600 | 94.3 | 67.1 | 5.7 | 1.05 | 114 |
| Other Amines | | | | | | |
| PEGDGE526 | MDA | 54 | 117.66 | 46.0 | 1.00 | 111 |
| PEGDGE526 | HMDA | 0 | Dissolved | 100 | 1.00 | 101 |
| PEGDGE526 | MOCA | 79.3 | 50.64 | 20.7 | 1.00 | 110 |

Initial screening of the candidate polymers indicated that the commercially popular aromatic di- and tri-epoxides (BADGE and TAMTGE) combined with Jeffamines® D230 to D4000 are substantially more stable to ethanol than previously disclosed aromatic selective membrane polymers exemplified by diepoxide crosslinked/esterified polyimide-aliphatic polyester copolymers (prepared according to U.S. Pat. No. 5,550,199). Swelling appeared to be roughly proportional to the polyether molecular weight. Polymers prepared from aliphatic glycidylethers (EGDGE, PEGDGE526 and TMPTGE) were less stable or dissolved completely. The aliphatic triepoxide (TMPTGA) based polymer completely dissolved in multiple tests. The aromatic diglycidylaniline (MBDGA) polymers had stability similar to those from the other aromatic based epoxies, but with less swelling. The use of MOCA or 4,4'-Methylene-bis(2-chloroaniline), with PEGDGE526, Poly(ethylene glycol)diglycidyl ether, average Mn 526 also gave improved stability polymers over those from the aliphatic amines MDA and HMDA. Unexpectedly, the polymers based on the aliphatic epoxide, DENO, were found to be exceptionally stable in the three-day screening test.

In a similar manner, longer term testing of the most promising candidate membrane polymers was undertaken by subjecting samples to ethanol at 150° C. for up to 28 days. Multiple samples were used and taken periodically. The epoxides used were Triaromatic (TAMTGE) and Aliphatic DENO, with the molecular weight of the diamine terminated polypropylene oxide or poly(propylene oxide/polyethylene oxide) copolymer in the synthesis of the epoxy resin identified in the Table.

DENO stands for 1,2,7,8-diepoxy-n-octane and has the structure noted below. The aromatic triepoxide, Tris(4-hydroxyphenyl)methane triglycidyl ether (TAMTGE) has the following structure:

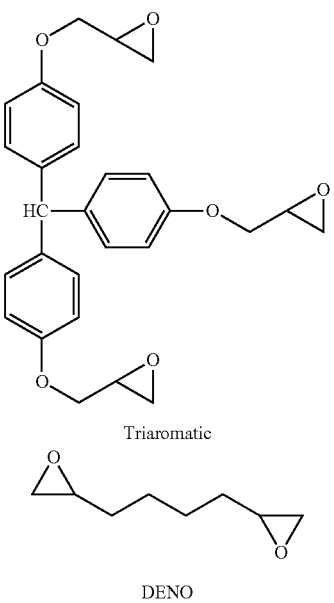

Triaromatic

DENO

The D230 and D400 polymers are diamine terminated polypropylene oxides of 230 and 400 molecular weight, also known as poly(propyleneglycol)bis(2-aminopropylether). The ED600 polymer is a diamine terminated polyether consisting of a block copolymer having a polyethylene oxide core and very short propylene oxide tails, also known as poly(propyleneglycol)-block-poly(ethyleneglycol)-block poly(propyleneglycol)bis(2-aminopropylether). These diamine terminated polymers were used as the amine component in the epoxy resin synthesis. For each prepared resin, the ratio of the number of equivalents of epoxide to the equivalents of amine hydrogen used in the synthesis was 1.0 to 1.05.

As shown in Table 3, the DENO based polymers retain more weight, equating to less degradation, in the 28 day (672 hour) test than the aromatic epoxide.

TABLE 3

28 Day Ethanol Stability Test Results
28 Day Ethanol Stability Test, Weight Fraction Retained, %

| | Epoxy | | | | |
|---|---|---|---|---|---|
| | Triaromatic | Triaromatic Polyether diamine | DENO | DENO | DENO |
| Time (days) | D400 | ED600 | D230 | D400 | ED600 |
| 3 | 99.8 | 98.5 | 98.3 | 97.4 | 94.4 |
| 7 | 91.9 | 92.8 | 97.3 | | |
| 14 | 88.6 | 82.0 | 93.4 | 84.1 | 87.5 |
| 28 | 43.8 | 29.4 | 97.7 | 93.6 | 90.3 |

The difference in molecular structures between DENO and the triaromatic epoxide is that a heteroatom (i.e., oxygen) is present between the epoxide ring and the aromatic ring in the triaromatic epoxide. Though not wishing to be bound to any particular theory, the inventors believe that under pervaporation conditions, ethanol molecules have a high propensity to attack a specific carbon center adjacent to the ether group in epoxy amine resins, particularly when aromatic glycidyl ethers are used as epoxides such as the above noted triaromatic polymer. This degradation was also noted in a sample of bisphenol A diglycidyl ether (abbreviated as BADGE, structure shown below) chosen as the epoxide for polymer membrane preparation. It is therefore one aspect of the present invention that such heteroatom (oxygen, sulfur, etc) linkage be avoided for the successful formulation of ethanol stable membranes. A modified bifunctional epoxide such as divinylbenzene diepoxide (structure shown below) is preferred to the bisphenol A diglycidyl ether.

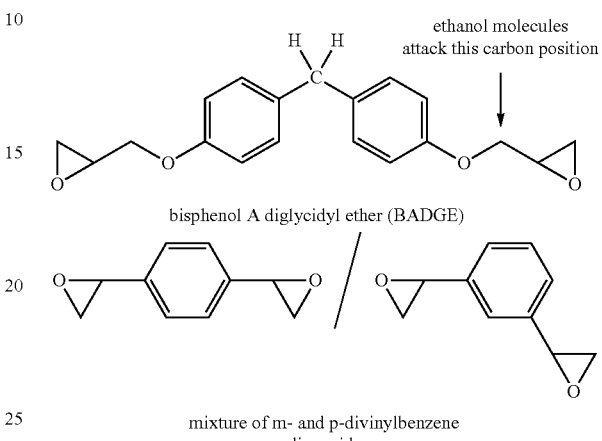

bisphenol A diglycidyl ether (BADGE)

mixture of m- and p-divinylbenzene diepoxide

Furthermore, the swelling behavior of the DENO based polyether polymers indicates that ethanol and toluene are preferentially absorbed compared with n-heptane. The results are shown in Table 4. The procedures used are those described in Example 7. Increasing the polyether segment length (MW) leads to lower a Tg and an increase in swelling, likely as a consequence of lowering the crosslink density. The swelling in E10 model feed indicates ethanol dominates swelling behavior. Varying the polyether segment size could be used to control membrane flux and selectivity.

TABLE 4

Swelling of DENO Based Jeffamine ® Polyether Polymers.

| | Weight Change (%) | | | | |
|---|---|---|---|---|---|
| Polyether | Heptane | Toluene | Ethanol | Model Feed* | Tg (C.) |
| D-230 | 0.31 | 16.2 | 39 | 40 | 41 |
| D-400 | 2.1 | 52.3 | 51.5 | 57.8 | 12 |
| ED-600 | 1.7 | 50.6 | 61 | 61 | −26 |

*Toluene/heptane/ethanol 45/45/10

Attempts to prepare free standing films of these DENO crosslinked Jeffamine® polyether polymers for use as membranes were not successful, because of excessive swelling and fragility of the polymer.

Process for Making the Polyether Containing Epoxy Resin Membrane

Referring to FIG. 1, there is illustrated a polymer coated porous substrate membrane system in accordance with the present invention. Though not required in all applications of the present invention, a porous substrate may be used for physical support and enhanced membrane integrity. A substrate (10), here shown as disposed under layer (12), comprises a porous material such as a ceramic monolith, for example. Substrate (10) is characterized as comprising a porous material, suitable for physical support of the polymeric membrane detailed hereinafter. The porosity of the substrate is selected based upon the feed materials that it will be used for separating. That is, the pore size of the substrate is selected to provide little or no impedance to the permeation of the materials that are intended to be the permeate of the overall membrane system. It is also preferred that the ceramic substrate is substantially permeable to hydrocarbons such as gasoline, diesel, and naphtha for example. It is also preferred that the pore size distribution is asymmetric in structure, e.g., a smaller pore size coating is supported on a larger pore size inorganic structure.

Non-limiting examples of supported membrane configurations include casting the membrane onto a support material fabricated from materials such as, but not limited to CeraMem® and Corning® ceramic monoliths, porous polytetrafluoroethylene (e.g., Teflon®), aromatic polyamide fibers (e.g., Nomex® and Kevlar®), porous metals, sintered metals, porous ceramics, porous polyester, porous nylon, activated carbon fibers, latex, silicones, silicone rubbers, permeable (porous) polymers including polyvinylfluoride, polyvinylidenefluoride, polyurethanes, polypropylenes, polyethylenes, polycarbonates, polysulfones, and polyphenylene oxides, metal and polymer foams (open-cell and closed-cell foams), silica, porous glass, mesh screens, and combinations thereof. Preferably, the polymeric membrane support is selected from polytetrafluoroethylene, aromatic polyamide fibers, porous metals, sintered metals, porous ceramics, porous polyesters, porous nylons, activated carbon fibers, latex, silicones, silicone rubbers, permeable (porous) polymers including polyvinylfluoride, polyvinylidenefluoride, polyurethanes, polypropylenes, polyethylenes, polycarbonates, polysulfones, and polyphenylene oxides and combinations thereof.

Layer (12) comprises the polymer membrane. There are a number of alternative techniques, known to the skilled practitioner, for fabricating the polymer membrane taught herein. In a preferred embodiment, the polymer membrane may be made by casting a solution of the polymer precursor onto a suitable support, such as a ceramic monolith, here shown as substrate (10). The solvent is evaporated and the polymer cured by heating to obtain a dense film having a thickness of typically 1 to 100 microns and preferably from 1 to 10 microns.

The membrane compositions and configurations of the present invention can also be utilized in both unsupported and supported configurations. A non-limiting example of an unsupported membrane configuration includes casting the membrane on a glass plate and subsequently removing it after the chemical cross-linking reaction is completed.

The membrane compositions and configurations of the present invention can be employed in separation processes that employ a membrane in any workable housing configuration such as, but not limited to, flat plate elements, wafer elements, spiral-wound elements, porous monoliths, porous tubes, or hollow fiber elements.

The membranes described herein are useful for separating a selected component or species from a liquid feed, a vapor/liquid feed, or a condensing vapor feeds. The resultant membranes of this invention can be utilized in both perstractive and pervaporative separation processes.

The membranes of this invention are useful for separating a desired species or component from a feedstream, preferably a hydrocarbon feedstream containing at least one alcohol.

In a preferred embodiment, the membrane compositions and configurations above are utilized for the selective separation of ethanol and aromatics from a hydrocarbon feedstream containing aromatics and non-aromatics and at least one alcohol, typically ethanol.

In another embodiment, the membrane compositions and configurations above are utilized to selectively separate sulfur and nitrogen heteroatoms from a hydrocarbon stream containing sulfur heteroatoms and nitrogen heteroatoms.

In a pervaporative membrane mode, a feed (14) comprising gasoline and optionally containing ethanol, for example, is fed to the membrane (12).

The aromatic constituents of the gasoline feed preferentially absorb into and migrate through the membrane (12). A vacuum on the permeate (16) side vaporizes the permeate, which has an increased concentration of aromatics (relative to feed (14).

Membrane separation will preferentially operate at a temperature less than the temperature at which the membrane performance would deteriorate or the membrane would be physically damaged or chemically modified (e.g. oxidation). For hydrocarbon separations, the membrane temperature would preferably range from about 32° F. to about 572° F. (0 to 300° C.), and more preferably from about 75° F. to about 392° F. (24 to 200° C.).

In still another embodiment, the hydrocarbon feedstream is a naphtha with a boiling range of about 80° to about 450° F. (27° to 232° C.), and contains aromatic and non-aromatic hydrocarbons and at least one alcohol. In a preferred embodiment, the ethanol and aromatic hydrocarbons are separated from the naphtha feedstream. As used herein, the term naphtha includes thermally cracked naphtha, catalytically cracked naphtha, and straight-run naphtha. Naphtha obtained from fluid catalytic cracking processes ("FCC") are particularly preferred due to their high aromatic content.

The feed (14) may be heated from about 50° C. to about 200° C., preferably about 80° C. to about 160° C. While feed (14) may be liquid, vapor, or a combination of liquid and vapor, when feed (14) contacts the membrane (12) it is preferably vapor-liquid mixture. Accordingly, the feed side of the membrane may be elevated in pressure from about atmospheric to about 150 psig to selectively maintain at least a portion of the feed contacting the membrane in a liquid form.

The operating pressure (vacuum) ranges in the permeate zone would preferably be from about atmospheric pressure to about 1.0 mm Hg absolute.

In a preferred embodiment, the permeate is condensed into liquid form, then "swept" by a liquid or vapor sweep stream. The permeate dissolves into the sweep stream and is conducted away by sweep stream flow in order to prevent the accumulation of permeate in the permeate zone.

EXAMPLES

The below non-limiting examples identify specific epoxy based polymer membranes that were prepared and tested to illustrate this invention.

Example 1

TAMTGE-D400 Pre-Polymer Synthesis

An aromatic epoxy-polyether amine crosslinked membrane polymer was made with equivalent amounts, 18.02 g of Tris(4-hydroxyphenyl)methane triglycidyl ether, or TAMTGE (Aldrich) and 11.75 g of Polypropylene glycol)bis (2-aminopropyl ether), Mn ~400, D400 (Aldrich/Huntsman). These were combined in a round bottom flask and reacted for 1 hour at 60° C. This mixture was quenched with cool toluene to obtain a 25% solution of the pre-polymer having a viscosity of 1.8 cP at 20° C. The final epoxy:NH ratio was 1.0.

Samples of this pre-polymer solution were cured in nitrogen at 150° C. for 12 hours and subjected to ethanol stability tests as described in the text above. After 3 days of testing this TAMTGE-D400 polymer retained 98.4% of its original weight. After 28 days in ethanol at 150° C. the polymer retained 43.8% of its original weight.

Example 2

DENO-D400 Pre-Polymer Synthesis

An aliphatic epoxy-polyether amine crosslinked membrane polymer was made with near equivalent amounts, 10.50 g of 1,2,7,8-Diepoxy-n-octane, or DENO (Aldrich) and 14.40 g of Polypropylene Glycol bis 2 aminopropyl ether, D400 (Aldrich/Huntsman). These were combined in a 250 ml pressure flask with 1.20 g ethanol catalyst and reacted for 1 hour, 15 minutes in an oil bath at 100° C. This mixture was quenched with cool toluene to obtain a 25% solution of the pre-polymer having a viscosity of 3.3 cP at 25° C. The final epoxy:NH ratio was 1.05.

A 2 g sample of this solution was cast in a small aluminum pan, the solvent evaporated overnight, and cured at 150° C. for 12 hours. The glass transition temperature, Tg, was determined by differential scanning colorimetry "DSC" to be 1.8° C. The ethanol sorption capacity of the polymer was determined to be about 37.9% wt of the swollen solvated polymer after 67 hours at an ambient temperature of about 23° C. using excess ethanol.

Samples of this pre-polymer solution were cured in nitrogen at 150° C. for 12 hours and subjected to ethanol stability tests as described in the text above. After 3 days of testing this DENO-D400 polymer retained 97.4% of its original weight. After 28 days in ethanol at 150° C. the polymer retained 93.6% of its original weight.

Example 3

Monolith Coating with TAMTGE-D400

A CeraMem® 0.13 m2 test monolith (CeraMem® Corporation, Newton, Mass.) with nominal 0.01 micron surface porosity was coated with the freshly made TAMTGE-D400 pre-polymer solution prepared from Example 1. The monolith was mounted in a housing that allowed filling and draining of the monolith channels with pre-polymer solution, while maintaining a pressure of ~8 kPag nitrogen on the outside of the porous monolith to prevent excessive infiltration. The monolith channels were completely filled with 90 ml of pre-polymer solution, tapped or vibrated to ensure all channels were free of trapped gas bubbles, and then drained leaving behind a thin film of polymer. The nitrogen back pressure was released and air flowed through the channels for about 2 minutes to free the channels of any residual liquid and partially evaporate the solvent. The monolith was removed from the housing and allowed to dry in ambient air overnight. The polymer was pre-cured by placing the coated monolith in a nitrogen purged oven heated from 30° to 150° C. at 2° C./min and then 60 min at 150° C. Polymer weight on the monolith was 5.73 g. A vacuum test of the monolith in the housing indicated good membrane integrity, with only modest loss of pressure when isolated on the shell side of housing from 12 to 15 kPa over 5 minutes, with channels at ambient pressure. A second coating was considered, but not required. Final cure of the polymer was conducted by holding at 150° C. for 12 hours. Final polymer weight was 5.58 g or 50.7 g/m$^2$ (assuming 0.11 m$^2$ actual area) corresponding to a polymer thickness of 50 microns. A final vacuum test confirmed the same results as the initial test. Membrane integrity was also confirmed by pressurizing the channels with nitrogen to 416 kPag, while maintaining a vacuum at 23 kPa on the shell side. Isolating both indicated a pressure loss of only 1.9 kPa/min and vacuum loss of 1.3 kPa/min.

Example 4

Monolith Coating with DENO-D400

A CeraMem® 0.13 m2 test monolith (CeraMem® Corporation, Newton, Mass.) with nominal 0.01 micron surface porosity was coated with the DENO-D400 pre-polymer solution prepared from Example 2. The monolith was mounted in a housing and coated as described in Example 3. The monolith channels were filled with the 25% pre-polymer solution in toluene, vibrated, and then drained leaving behind a thin film of polymer. The nitrogen back pressure was released and air flowed through the channels to free the channels of any residual liquid and partially evaporate the solvent. The monolith was removed from the housing and allowed to dry in ambient air overnight. The polymer was pre-cured by placing the coated monolith in a nitrogen purged oven heated from 30° to 150° C. at 2° C./min and then 3 hours at 150° C. Polymer weight on the monolith was 3.60 g. A vacuum test of the monolith in the housing indicated the membrane did not hold vacuum. The monolith was recoated twice with a 12.5% solution of the DENO-D400 pre-polymer in toluene as above. After drying and curing at 150° C. for 3 hours, the coated membrane showed only modest loss of pressure when isolated on the shell side of housing from 19 to 22 kPa over 5 minutes, with channels at ambient pressure. The final polymer weight was 3.68 g or 33.5 g/m$^2$ corresponding to a polymer thickness of ~33 microns.

Example 5

Pervaporation Testing of Polymer Coated Monoliths with E10 Model Feed Membrane Testing of the TAMTGE-D400 Membrane Monolith The TAMTGE-D400 membrane monolith from Example 3 was evaluated in a test unit with a model feed to evaluate aromatic and ethanol separation from aliphatic hydrocarbons. The E10 model feed was prepared by blending equal amounts of n-heptane and toluene by weight with 200 proof ethanol to obtain a nominal composition of 45% n-heptane, 45% toluene and 10% ethanol. The actual composition, determined by gas chromatography, used in this test contained 45.6 wt % n-heptane, 45.2 wt % toluene and 9.1 wt % ethanol.

The monolith was mounted vertically with the inlet at the top of the housing and the retentate and permeate outlets at the low side. Process conditions were established with a feed rate of 1.0 g/s at 500 kPag and ~150° C. fed through a BETE WL1/2-90 nozzle (BETE Fog Nozzles, Inc., Greenfield, Mass.) to distribute the feed to the monolith channels. At these conditions the feed is partially vaporized. The membrane module was insulated and operated adiabatically. A vacuum was maintained on the outer annulus of the membrane housing by means of an Fox 0.031" orifice mini-eductor pump (Fox Valve Development Corp, Dover, N.J.) using cooled permeate product supplied at 500 kPag to entrain fresh permeate vapor at ~15 kPaa from the membrane. Samples of permeate and retentate were collected, weighed and analyzed by gas chromatography.

After 137 hours on stream, with the inlet temperature at 153° C., the permeate rate was 0.44 g/m2-s, resulting in a yield of 4.7% on feed. Corresponding flux was 22.3 g-microns/m2-sec. Aromatic Selectivity was 4.0 and Ethanol+Aromatic Selectivity 5.3. The permeate composition was 14.0% n-heptane, 54.1% toluene and 31.9% ethanol (wt/wt). Both ethanol and toluene were substantially concentrated relative to the feed.

The results are summarized in Table 5. A comparative example results are also shown.

TABLE 5

Comparison of Membranes using E10 Model Feed

| Comparison of Membranes using E10 Model Feed | E10MF | Comparative Example | Example 5 | Example 6 |
|---|---|---|---|---|
| Polymer | | TAMTGE-D400 | TAMTGE-D400 | DENO-D400 |
| Membrane Support | | Gortex | Monolith AI-1589 | Monolith AI-1586 |
| Polymer, g | | 0.11 | 5.58 | 3.68 |
| Feed | | E10MF | E10MF | E10MF |
| Time on Stream, Hours | | 193.4 | 137 | 140.8 |
| Temperature, C. | | 144.8 | 152.8 | 155.7 |
| Permeate rate, g/m2-s | | 0.351 | 0.44 | 2.63 |
| Yield, wt % | | 5.3% | 4.7% | 28.4% |
| Flux, g-um/m2-s | | 38.9 | 22.3 | 88.1 |
| Aromatic Selectivity | | 3.22 | 4.00 | 2.42 |
| Ethanol + Aromatic Selectivity | | 5.53 | 5.26 | 3.05 |
| Permeate Composition | | | | |
| n-Heptane, wt % | 45.6 | 13.4 | 14 | 25.5 |
| Toluene, wt % | 45.2 | 41 | 54.1 | 51.1 |
| Ethanol, wt % | 9.1 | 45.6 | 31.9 | 23.4 |
| Density, g/cc | 0.7651 | | 0.8117 | 0.7949 |

Example 6

Membrane Testing of the DENO-D400 Membrane Monolith

The DENO-D400 membrane monolith from Example 4 was evaluated in a test unit with a model feed to evaluate aromatic and ethanol separation from to aliphatic hydrocarbons in the same manner as described in Example 5.

The E10 Model Feed performance of the monolith supported DENO-D400 polymer membrane is shown in Table 5. After 141 hours on stream, with the inlet temperature at 156° C., the permeate rate was 0.2.6 g/m2-s, resulting in a yield of 28.4% on feed. Corresponding flux was 88 g-microns/m2-sec. Aromatic Selectivity was 2.4 and Ethanol+Aromatic Selectivity 3.1. The permeate composition was 25.5% n-heptane, 51.1% toluene and 23.4% ethanol (wt/wt). Both ethanol and toluene were substantially concentrated relative to the feed.

Figure 2:
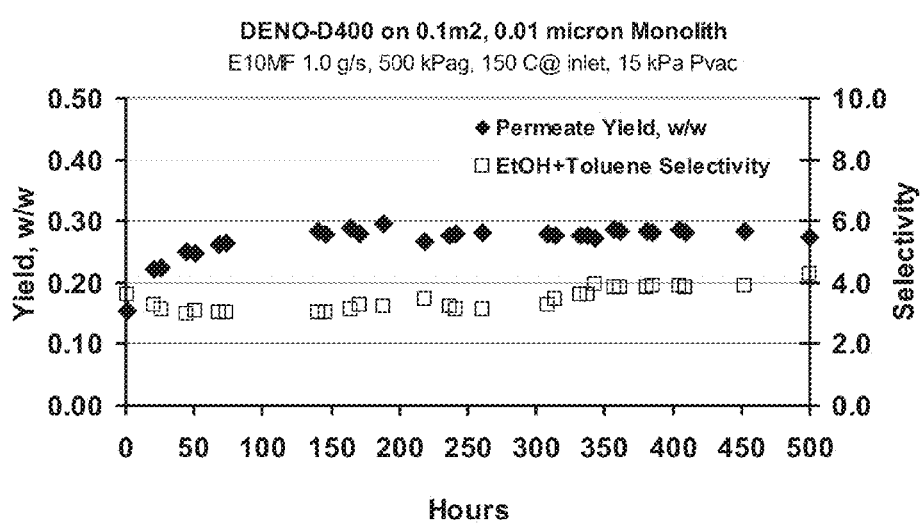
FIG. 2 is a graph that illustrates membrane performance with E10 model feed.

The E10 Model Feed test continued through 500 hours. The results are shown in FIG. 2. Permeate yield increased from 15% at startup to nearly 30% w/w at 150 hours. The yield remained nearly constant to 500 hours, with the Ethanol+Aromatic Selectivity improved from 3.1 to 4.3. These results confirm the stability of the DENO-D400 polymer to ethanol containing hydrocarbon feeds, consistent with the 28 day (672 hours) ethanol stability test described above and in Table 3.

After 500 hours on stream with the E10 model feed, the DENO-D400 membrane monolith was then used to process an E10 regular gasoline feed at a feed rate of 0.2 g/s. The pressure was decreased by 100 kPa to 400 kPag, while maintaining the temperature at 153° C., to obtain the desired vapor/liquid feed mixture (nominally 70% vapor on feed, w/w). The permeate pressure increased to ~30 kPa, reflecting the higher vapor pressure of the gasoline permeate product to the eductor. After an additional 242 hours of use with E10 gasoline feed, and a total time of 747 hours, a material balance was taken and the products characterized. The results are shown in Table 5. The permeate yield was 18.9% with an octane number of 102.6 RON, by ATSM 2699, a substantial increase of that measured for the E10 gasoline blend of 93.7 RON. Correspondingly, the retentate octane number was lowered to 92.6 RON. The DENO-D400 membrane effectively concentrated the high octane number components in the feed leading to a permeate composition with 24.4 wt % ethanol and 40.8 wt % aromatics. The retentate was depleted of both ethanol and aromatics, and contained higher concentration aliphatic hydrocarbons, consistent with the lower octane rating. These composition differences are reflected in the product densities measured, with the permeate higher and retentate lower than that of the original feed. We also noted that the permeate remained colorless, while the high boiling color bodies, primarily multi-ring aromatics, additives and dyes, remained in the retentate.

TABLE 6

E10 Gasoline Example
E10 Gasoline Example
Conditions: 746.6 hours, 0.218 g/s, 415 kPag, 153.5/136.2 C., 31.9 kPa Pvac

| | Feed | Permeate | Retentate |
|---|---|---|---|
| Yield, wt % | 100.0% | 18.9% | 81.1% |
| RON | 93.7 | 102.6 | 92.6 |
| Composition, wt % | | | |
| C1-C5 HC | 15.9% | 9.8% | 17.0% |
| C6+ Non-Aromatics | 41.5% | 24.9% | 45.1% |
| Aromatics | 33.3% | 40.8% | 30.6% |
| Ethanol | 9.3% | 24.4% | 7.2% |
| Density, g/cc | 0.7449 | 0.7784 | 0.7383 |
| Color | Red | Colorless | Red |

Figure 3:
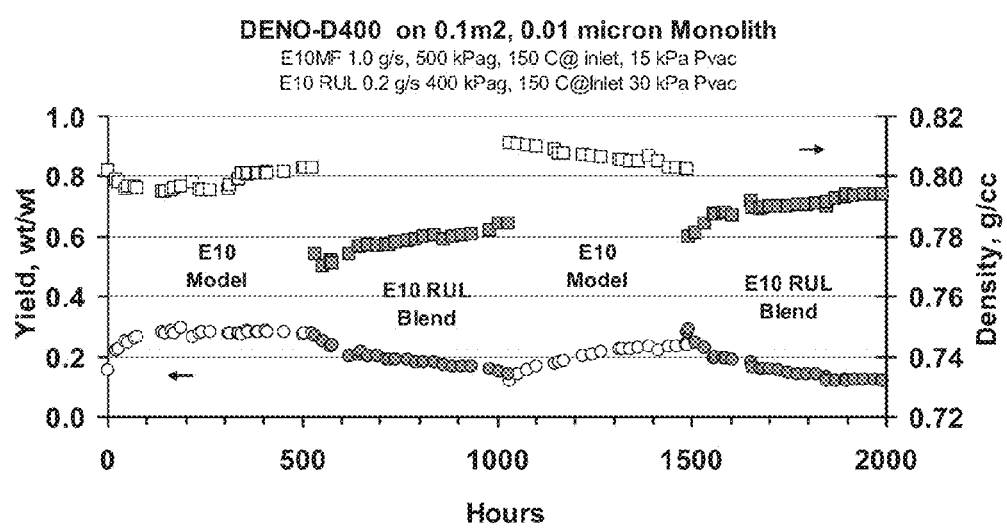
FIG. 3 is a graph that illustrates membrane performance with E10 model feed and E10 gasoline.

The test on E10 gasoline continued through 1000 hours. The test results are shown in FIG. 3. The flux and corresponding yield of permeate decreased slowly with time from 27% at 532 hours to a still useful 14.3% at 1029 hours. As the yield decreased, the permeate product density increased, indicating a higher octane number product.

At 1030 hours the feed and conditions were changed back to those used initially with the E10 model feed. The initial permeate yield obtained with the E10 model feed, 12.1 wt % at 1034 hours confirmed the flux loss observed on processing E10 gasoline. The density of the permeate was higher than obtained initially with E10 model feed. Continuing the E10 model feed for an additional 450 hours resulted in substantial recovery of permeate flux, and a corresponding decrease in permeate density, to levels similar to those initially obtained with the E10 model feed. The results are provided in Table 7. The results show that nearly 87% of the flux was recovered, with improvement in Aromatic Selectivity, from 2.6 at 525 hours to 2.9 at 1488 hours, and similar overall Ethanol+Aromatic Selectivity.

TABLE 7

E10 Model Feed before and after Gasoline Test

| E10 Model Feed before and after Gasoline Test | E10MF | Example 6 | Before Gasoline | After Gasoline | After Cleanup |
|---|---|---|---|---|---|
| Polymer | | DENO-D400 | DENO-D400 | DENO-D401 | DENO-D400 |
| Membrane | | Monolith | Monolith | Monolith | Monolith |
| Support | | AI-1586 | AI-1586 | AI-1587 | AI-1586 |
| Polymer, g | | 3.68 | 3.68 | 4.68 | 3.68 |
| Feed | | E10MF | E10MF | E10MF | E10MF |
| Time on Stream, Hours | | 140.8 | 524.5 | 1033.9 | 1487.7 |
| Temperature, C. | | 155.7 | 155 | 156.2 | 155.6 |
| Permeate rate, g/m2-s | | 2.63 | 2.57 | 1.13 | 2.23 |
| Yield, wt % | | 28.4% | 27.6% | 12.1% | 24.0% |
| Flux, g-um/m2-s | | 88.1 | 86.1 | 14 | 74.7 |
| Aromatic Selectivity | | 2.42 | 2.57 | 4.14 | 2.91 |
| Ethanol + Aromatic Selectivity | | 3.05 | 4.21 | 5.43 | 4.00 |
| Permeate Composition | | | | | |
| n-Heptane, wt % | 45.6 | 25.5 | 20.4 | 14 | 19.7 |
| Toluene, wt % | 45.2 | 51.1 | 52.6 | 54.6 | 50.6 |
| Ethanol, wt % | 9.1 | 23.4 | 27 | 31.4 | 29.7 |
| Density, g/cc | 0.7651 | 0.7949 | 0.8028 | 0.8113 | 0.7949 |

Returning to E10 gasoline feed and conditions at 1490 hours on stream confirmed the effectiveness of the cleanup with E10 Model feed. Permeate yield increased to 28.9%, then slowly decreased to 12.1% over 500 additional hours of operation. Correspondingly, the permeate product density increased as in the first cycle with E10 gasoline. However all permeate densities were higher at equivalent yields, indicating that the polymer selectivity continued to improve as the polymer membrane aged when processing E10 gasoline.

These results show that the DENO-D400 polymer membrane remains effective for pervaporation separation of ethanol and aromatics from hydrocarbon feeds containing alcohol over extended periods of time.

Controlling the Flux and Selectivity

We have discovered that the addition of controlled amount of a suitable monoepoxide to the epoxy resin formulation controllably changes the swelling of the resin and thereby the flux and selectivity of the resulting membrane.

To illustrate this aspect of the present invention, epoxy resins were prepared from 1,8-diepoxy-n-octane, a poly(propyleneglycol)bis(2-aminopropylether) of a nominal 400 number average molecular weight and various amounts (shown in plots below) of a monoepoxide, epoxybutane. The mole ratio of total epoxide to amine was held at 2.1 for all preparations. The resins were prepared from all of the above ingredients and a small amount of ethanol as catalyst at 100° C. The mixture was stirred vigorously until the preparation became viscous (a few hours). The preparations were then cast into open aluminum pans and transferred to an oven held at 150° C. The resins were cured overnight (at least 8 hours) at this temperature. The cured resins were cooled and removed from the pans for further testing.

The Tg and the swelling behavior of the prepared materials were tested. The Tg (glass transition temperature) was determined by differential scanning calorimetry (DSC). This test provided verification that the resins were completely cured (absence of exotherm in the experiment).

The prepared materials were also subjected to a 3-day swelling test to identify the differences in swelling brought about by the controlled addition of the epoxy butane to the formulation. The materials for the test procedure are described below:

Materials: DENO/D-400/Epoxybutane Resins

Four resins were prepared with various mole fractions of epoxybutane relative to the amount of DENO in the preparation. A control sample was prepared wherein epoxybutane was omitted from the recipe. Each of these resins was analyzed by DSC to determine their respective Tg values. Each resin was also subjected to the 3-day swelling test in heptane, toluene, ethanol and model feed. The results of these characterization tests are shown in Table 8.

Feed comprised 10 wt. % ethanol, 45 wt. % toluene and 45 wt. % heptane, prepared at room temperature.

Test Procedure:

1. Weigh a small piece (about 200 to 300 mg) of a 1/16" to 1/8" thick film of the cured resin to four places on an analytical balance. This value is the dry weight of the sample ($w_d$).
2. Place the piece of cured resin in a 10 ml vial and cover completely with 5 ml of solvent.
3. Seal the vial and store on the bench-top for three days.
4. On the third day, remove the sample from the solvent.
5. Remove surface liquid from all surfaces.
6. Weigh the sample to four places on the analytical balance until a stable value is obtained. This value ($w_s$) is the weight of the film plus adsorbed solvent or the weight of the swollen film.

TABLE 8

Swelling Properties of DENO/D-400/Epoxybutane Resins

| | Mass uptake (wt. %) | | | | |
|---|---|---|---|---|---|
| Fraction EB | Heptane | Toluene | Ethanol | Model Feed | Tg (° C.) |
| 0.00 | 2.2 | 48.8 | 54.5 | 61.1 | 11.8 |
| 0.10 | 3.7 | 56.5 | 60.4 | 64.4 | 4.6 |
| 0.19 | 3.8 | 62.5 | 68.5 | 76.8 | 0.6 |
| 0.30 | 4.9 | 67.8 | 74.8 | 76.9 | −2.2 |
| 0.40 | 5.2 | 72.7 | 84.8 | 81.6 | −7.6 |

Figure 4:
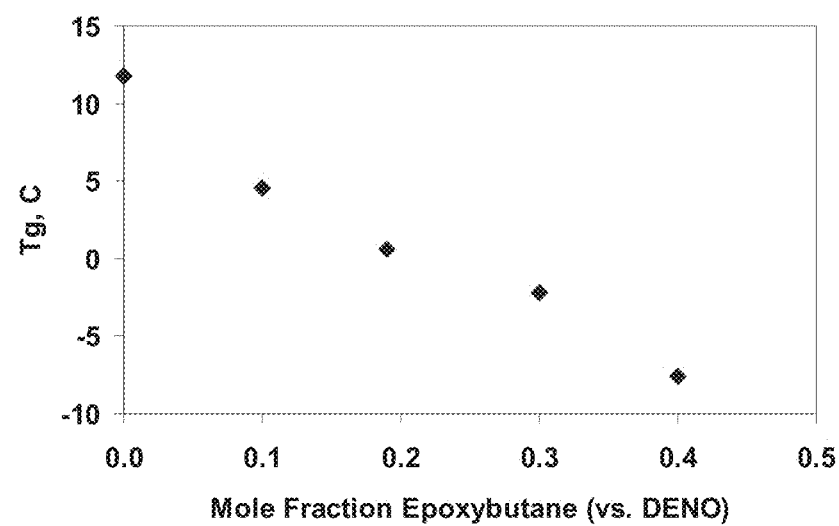
FIG. 4 is a graph of mole fraction epoxybutane of the membrane solution versus glass transition temperature.

As can been seen in the Table, increasing the amount of epoxybutane in the formulation lowers the crosslink density as indicated by a drop in the glass transition temperature and increases the swelling. The Tg values change in a controlled manner related to the amount of epoxybutane in the recipe as is shown by plotting Tg as a function of epoxybutane concentration, as shown in FIG. 4.

Figure 5:
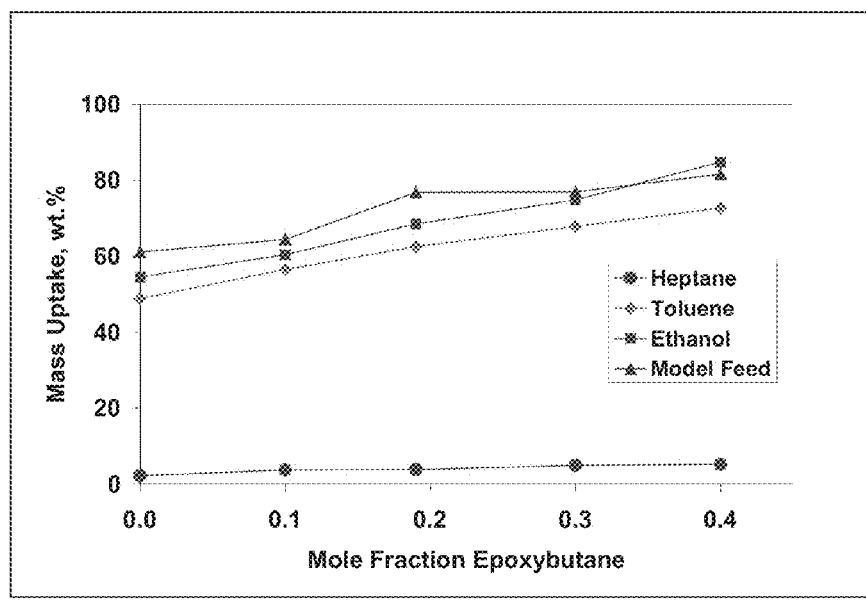
FIG. 5 is a graph of mole fraction epoxybutane of the membrane solution versus mass uptake of the membrane exposed to designated feeds.

For "good swelling solvents" like ethanol, toluene or the model feed, in which toluene and ethanol are components, increasing the amount of epoxybutane in the formulation increases the amount of material that swells the polymer. Good swelling solvents are those with combined Hansen solubility parameters greater than 8.0 MPa$^{1/2}$, wherein the combined Hansen solubility is defined as the square root of the sum of the squares of the dispersion and polar solubility parameters. Hansen solubility parameters for a variety of solvents and non-solvents may be found in Hansen, C. M., Hansen Solubility Parameters: A User's Handbook, Second Ed., CRC Press, Boca Raton, Fla., 2007. Additionally, the increase in mass uptake is more pronounced for good solvents than for heptane, a poor solvent. This is an alternate embodiment of the process for controlling the selectivity of these materials, as shown in FIG. 5.

What is claimed is:

1. A polymeric membrane for separating a hydrocarbon feedstream containing aromatics and alcohol, said membrane comprising a polyether epoxy resin having a reaction product of a polyetheramine and an aliphatic substituted epoxide, which does not contain a heteroatom within three (3) atoms of any epoxide group and which is fully aliphatic, fully aromatic, or a combination of aromatic and aliphatic, wherein the epoxide is divinylbenzene diepoxide, wherein the polyetheramine is selected from the group consisting of Poly(propylene glycol)bis(2-aminopropyl ether)s with an Mn ranging from about 230 to about 4000 and Poly(propylene glycol)-block-poly(ethylene glycol)-block-poly(propylene glycol)bis(2-aminopropyl ether) with an Mn about 600, and wherein said membrane is supported on a porous ceramic substrate having a surface pore size from 0.005 to 0.5 microns.

2. A method for separating aromatics from a gasoline feed containing aromatics and alcohol, said method comprising contacting the gasoline feed containing aromatics and alcohol with the membrane of claim 1 as a pervaporation membrane to separate the aromatics and/or the alcohol therefrom.

3. The method of claim 2 wherein said method produces a permeate product having an octane number at least 5 RON higher than the feed to the membrane.

4. The method of claim 2 wherein the gasoline comprises about 10% or greater of the alcohol.

5. The method of claim 3 or claim 4 wherein the alcohol is ethanol.

* * * * *